United States Patent Office 2,859,255
Patented Nov. 4, 1958

2,859,255

PROCESS FOR THE PREPARATION OF DIARYLALKANES

Donald G. Jordan, Stamford, Conn., and Leon Lazare, Westbury, N. Y., assignors to American Cyanamid Company, New York, N. Y., a corporation of Maine No Drawing. Application May 13, 1954
Serial No. 429,705

16 Claims. (Cl. 260—668)

This invention relates to the production of diarylethanes. More particularly this invention relates to the production of diarylethanes wherein acetylene and a mono- or di-alkyl substituted benzene is reacted in the presence of a sulfuric acid-mercuric sulfate catalyst under carefully controlled process conditions. Further, this invention relates to the production of diarylethanes wherein increased yields are obtained.

The reaction of acetylene with mono- and di-alkyl substituted benzenes is a known process. However, the previously employed processes for producing diarylethanes by this reaction have resulted in low yields and generally unsatisfactory results. Prior to our invention, yields of diarylethane produced were only in the order of about 60%, based on the acetylene charged into the reaction.

It is an object of our invention to produce diarylethanes by the reaction of acetylene and mono- or di-alkyl benzene, thereby obtaining increased yields. It is a further object of our invention to produce diarylethanes wherein the process employed is carefully controlled, thereby insuring the increased yields. These and other objects of our invention will be discussed more fully hereinbelow.

According to the process of our invention, acetylene in the vapor phase is introduced into the reaction zone and reacted with a compound selected from the group consisting of mono- and di-alkyl substituted benzenes in the presence of a sulfuric acid-mercuric sulfate catalyst. By carefully controlling the reaction conditions during the production of the diarylethanes, yields in the order of from about 75% to about 90% based on the substituted benzene employed and on the acetylene charged into the reaction are obtained. Diarylethanes produced in accordance with our invention may be cracked by processes well known in the art to yield nuclearly substituted styrenes. Polymers of the substituted styrenes such as methyl and dimethylstyrene which may be obtained possess certain improved physical properties, e. g., high heat distortion when compared to polystyrene.

Mono- and di-alkyl substituted benzenes that may be employed in the process of our invention are such as toluene, ortho-, meta- and para-xylene, ethyl benzene and the like. It is possible to react long-chain mono- and di-alkyl substituted benzenes in the process of our invention, the only limiting factor being the availability of the substituted benzenes. The reaction of the substituted benzene is carried out in a reaction zone in the presence of a sulfuric acid-mercuric sulfate catalyst into which acetylene in the vapor phase is introduced. The reaction zone is equipped with heat exchange means whereby the heat of reaction during the production of the diarylethanes may be controlled. This heat exchange surface may be in the form of horizontal or vertical bundles of tubes buried in the reacting mass, an external heat exchanger, or any other device well known in the art. It is also necessary to provide suitable agitation in the reaction zone whereby fully developed turbulence in the liquid phase is maintained. Not only does the agitation means develop turbulence of the reactants in the reaction zone but it also serves to circulate the reactants therein. We have found that, by maintaining fully developed turbulence in the reaction zone and by controlling the circulation rate of the reactants in the zone under controlled temperature ranges, increased yields of diarylethanes are realized.

All of the mono- or di-alkyl substituted benzene is introduced into the reaction zone. If desired the sulfuric acid-mercuric sulfate catalyst may be introduced simultaneously into the reaction zone with the substituted benzene. Both the catalyst and the substituted benzene may be introduced into the reaction zone through a common inlet or each of the components may be introduced therein through a separate inlet. After the reaction zone has been charged with the substituted benzene and the catalyst, acetylene in the vapor stage is then introduced into the zone after turbulence has been fully developed in the liquid components. The temperature of reaction is maintained, as by heat transfer coils suspended in the reaction mixture, within the range of from about −20° C. to about +50° C., preferably from about 0° C. to about +10° C. Inasmuch as the sulfuric acid-mercuric sulfate catalyst is prepared by dispersing mercuric sulfate in the acid, a certain amount of solid material will be present in the reaction mixture. Turbulence within the reaction mixture must be fully developed in order to obtain a homogeneous mixture of the four phases present, e. g., vapor, liquid organic, liquid sulfuric acid and solid. We have found that a desirable method of insuring fully developed turbulence in the reaction mixture is to circulate the reactants through the reactor at a rate which is high in comparison to the input rate of the reactants, and which displaces the reactor volume many times a minute. As an illustration, consider a reactor of volumetric capacity V. The reactants are pumped into the reactor at a rate F, the reactor is equipped with a means for agitation, or circulation, which will move W volumes of reaction mixture per minute. Then the ratio of these quantities should be $$\frac{W}{V}=10:1 \text{ or greater and } \frac{W}{F}=100:1 \text{ or greater}$$

This circulation rate W may be obtained by an external circulation pump or internal agitation means.

The ratio of V to F determines the average holding or residence time of the reactants in the reaction zone and the most desirable holding time is a function of the particular reaction and the degree of reaction desired. This holding time may vary from a few seconds to many hours. If desired, the circulation rate to the feed rate may be increased to any desired ratio. However, certain inherent limitations in the process equipment and the amount of reactants present in the zone impose a practical upper limit on this ratio. We therefore prefer that the circulation rate of the reactants in the zone be within the order of from about 100:1 to about 200:1. The reaction product is removed from the reaction zone at a rate equal to the rate of introduction of reactants therein. Therefore, it will be seen that, by maintaining a minimum circulation rate of the reactants in the zone as above specified, fully developed turbulence of the reactants is assured in the reaction zone.

The reaction is carried out at substantially atmospheric pressure. The mols of acetylene introduced into the reaction zone are based on the mols of mono- or di-substituted benzene charged and are within the order of from about 1:2 to about 1:15, respectively, preferably from about 1:5 to about 1:8, respectively. The catalyst employed is sulfuric acid containing mercuric sulfate which is finely ground and dispersed therein. Sulfuric acid of concentrations of from about 85% to about 105% may be employed in the process. It is preferred, however, that sulfuric acid of concentrations from about 88% to about 98.5% be used. The amount of sulfuric acid employed may vary over rather wide limitations, for example, from about one part of sulfuric acid per part of substituted benzene charged to about one part of sulfuric acid to about 25 parts of substituted benzene charged. It is preferred, however, that from about 1:12 to about 1:5 parts of sulfuric acid be employed per part of substituted benzene. The amount of mercuric sulfate that is dispersed in the sulfuric acid catalyst may also vary over rather wide limits. The amount of mercuric sulfate used is calculated as parts of metallic mercury present per part of sulfuric acid. Thus, from about 1:2500 to about 1:150 parts of mercuric sulfate, calculated as parts of metallic mercury per part of sulfuric acid, may be utilized in the process. It is preferred, however, that from about 1:1000 to about 1:333 parts of mercuric sulfate, calculated as parts of metallic mercury per part of sulfuric acid, be employed.

The process of our invention may be carried out as a semi-continuous or as a single- or multi-stage continuous operation. In the semi-continuous process, the substituted benzene and sulfuric acid containing the dispersed mercuric sulfate are introduced into the reaction vessel as above disclosed. The measured amount of acetylene is then charged into the reaction vessel in a continuous manner and the reaction carried out. While the reaction may be carried out in a single-stage continuous reactor, it is preferred that the reaction be carried out in a multi-stage continuous reactor. We have found that the average concentration of 1,1-diarylethane present in the reaction product will determine the percent yield of the 1,1-diarylethane recovered. It is apparent that a theoretical conversion of toluene to 100% of the 1,1-diarylethane could be realized. However, as the percent concentration of 1,1-diarylethane increases in the reaction mixture, undesirable side reactions take place involving the 1,1-diarylethane which decrease the ultimate yield of the 1,1-diarylethane recovered. Thus, by controlling the average concentration of the 1,1-diarylethane in the reaction mixture, optimum yields are obtained.

Carrying out the reaction in a semi-continuous operation gives satisfactory yields. Inasmuch as a semi-continuous operation entails charging and discharging the reactor after each reaction, it is desirable to carry out the reaction in a continuous reactor. It is well known that a batch or semi-continuous reaction has a higher conversion and a smaller reactor volume than a single-stage continuous reactor. By utilizing a multi-stage reactor, a closer approach to the desirable features of the semi-continuous reactor may be realized.

In the procedure for carrying out the process of our invention in a multi-stage reaction zone all of the compound selected from the group consisting of mono- and di-alkyl substituted benzene is introduced into the first reaction zone with the sulfuric acid mercuric sulfate catalyst. After agitation and circulation of this reaction mixture in the zone at a sufficient rate to fully develop turbulence and to obtain a homogeneous reaction mixture has been accomplished, the temperature of the mixture is controlled at the desired point. When a multi-stage reactor of $n$ zones is employed, $1/n$th of the total amount of acetylene in the vapor phase to be employed is introduced into the first zone. The reaction mixture is removed from the first stage of the multi-stage reactor at a rate equal to the rate of introduction of reactants thereinto and is introduced into the second stage of the reactor. In the second stage of the reactor $1/n$th of the total amount of the acetylene to be reacted is then introduced. Reaction continues in the second stage of the reaction under conditions maintained in the first stage. The procedure is repeated until the total number of reaction zones and the total amount of acetylene to be reacted have been employed.

An alternative procedure that may be employed wherein a multi-stage reaction zone is utilized is to introduce into the first zone of the reactor only a portion of the acetylene in the vapor phase which need not be $1/n$th of the total amount where $n$ zones are used. Thus, the amount of acetylene introduced into each of the total zones of the reactor may vary. For example, as much as 50% of the total amount of acetylene may be introduced into the first stage of the reactor and the remainder introduced in equal amounts into the other reaction zones. Obviously, other proportions may be introduced into each stage of the multi-stage reactor if desired.

Another alternative that may find use herein is to introduce the sulfuric acid-mercuric sulfate catalyst into the various zones of a multi-stage reactor in varying amounts. Thus, it is only necessary to introduce all of the substituted benzene into the first zone of the multi-stage reactor. Obviously, no reaction will take place unless a portion of the total amount of acetylene with a portion of the catalyst is introduced into the first zone. Also, it is necessary to maintain the reaction temperature within the order specified as well as to control the circulation rate in said reaction zones within the range set forth above to assure optimum yields. The number of zones in a multi-stage reactor and the amount of reactants added to the substituted benzene or the reaction mixture containing substituted benzene and converted diarylethane may be easily determined for optimum yields by persons skilled in the art. It has been found that a four-stage continuous reactor is satisfactory. When a multi-stage reactor of $n$ stages is used, the amount of sulfuric acid-mercuric sulfate catalyst and/or acetylene that is introduced into each zone may be $1/m$th of the total amount to be used where $m$ is always greater than 1. In certain instances, $m$ and $n$ may be equal but it is not necessary that this be so. $m$ has no theoretical upper limit but for practical purposes a value of 10 is seldom exceeded.

In order that those skilled in the art may more fully understand the inventive concept herein presented, the following examples are given by way of illustration and not limitation. All parts are parts by weight.

*Example 1*

In a single-stage continuous reaction zone 736 parts of toluene per unit time and 98 parts of 98% sulfuric acid per unit time containing 0.26 part of mercuric sulfate dispersed therein were introduced into a reaction zone equipped with inlet means, circulation means and heat control means. The temperature was controlled at about −10° C. after agitation and circulation of the reactants was begun. Upon reaching control temperature, 26 parts of acetylene in the vapor phase per unit time were then introduced into the reaction mixture. The ratio of reactor volume to feed rate was such that there was an average retention time of about 20 minutes. Fully developed turbulence of the reactants was assured by maintaining the circulation rate greater than 100:1. The yield of 1,1-ditolylethane based on the amount of toluene charged was 78.5% and based on the amount of acetylene was 73.3%.

*Example 2*

The preceding example was repeated except that the temperature of reaction was adjusted to about +5° C. The amount of toluene charged to the reactor in this example was 460 parts and the amount of acetylene charged was 26 parts. The yield of 1,1-ditolylethane based on the amount of toluene charged was 79.1%.

We claim:
1. A process for producing 1,1-diarylethane which comprises introducing acetylene in the vapor phase, a compound selected from the group consisting of mono- and di-alkyl substituted benzene and a sulfuric acid-mercuric sulfate catalyst into a reaction zone wherein the acetylene is present in a molar ratio of from about 1:2 to about 1:15 per mol of said substituted benzene, agitating and circulating the reaction mixture in the zone at a sufficient rate to fully develop turbulence so as to obtain a homogeneous reaction mixture and wherein the circulation rate to feed rate of reactants into said zone is at least 100:1, maintaining the temperature of reaction within the range of from about —20° C. to about 50° C. and removing the reaction product from said bone at a rate equal to the rate of introduction of reactants thereinto.

2. A process for producing 1,1-diarylethane which comprises introducing acetylene in the vapor phase, a compound selected from the group consisting of mono- and di-alkyl substituted benzene and a sulfuric acid-mercuric sulfate catalyst into a reaction zone wherein the acetylene is present in a molar ratio of from about 1:5 to about 1:8 per mol of said substituted benzene, agitating and circulating the reaction mixture in the zone at a sufficient rate to fully develop turbulence so as to obtain a homogeneous reaction mixture and wherein the circulation rate to feed rate of reactants into said zone is within the order of from about 100:1 to about 200:1, maintaining the temperature of reaction within the range of from about 0° C. to about +10° C. and removing the reaction product from said zone at a rate equal to the rate of introduction of reactants thereinto.

3. A process for producing 1,1-ditolylethane which comprises introducing acetylene in the vapor phase, toluene and a sulfuric acid-mercuric sulfate catalyst into a reaction zone wherein the acetylene is present in a molar ratio of from about 1:2 to about 1:15 per mol of said toluene, agitating and circulating the reaction mixture in the zone at a sufficient rate to fully develop turbulence so as to obtain a homogeneous mixture and wherein the circulation rate to feed rate of reactants into said zone is at least 100:1, maintaining the temperature of reaction within the range of from about —20° C. to about 50° C. and removing the reaction product from said zone at a rate equal to the rate of introduction of reactants thereinto.

4. A process for producing 1,1-ditolyethane which comprises introducing acetylene in the vapor phase, toluene and a sulfuric acid-mercuric sulfate catalyst into a reaction zone wherein the acetylene is present in a molar ratio of from about 1:5 to about 1:8 per mol of said toluene, agitating and circulating the reaction mixture in the zone at a sufficient rate to fully develop turbulence so as to obtain a homogeneous mixture and wherein the circulation rate to feed rate of reactants into said zone is within the order of from about 100:1 to about 200:1, maintaining the temperature of reaction within the range of from about 0° C. to about +10° C. and removing the reaction product from said zone at a rate equal to the rate of introduction of reactants thereinto.

5. A process for producing 1,1-dixylylethane which comprises introducing acetylene in the vapor phase, xylene and a sulfuric acid-mercuric sulfate catalyst into a reaction zone wherein the acetylene is present in a molar ratio of from about 1:2 to about 1:15 per mol of said xylene, agitating and circulating the reaction mixture in the zone at a sufficient rate to fully develop turbulence so as to obtain a homogeneous mixture and wherein the circulation rate to feed rate of reactants into said zone is at least 100:1, maintaining the temperature of reaction within the range of from about —20° C. to about 50° C. and removing the reaction product from said zone at a rate equal to the rate of introduction of reactants thereinto.

6. A process for producing 1,1-dixylylethane which comprises introducing acetylene in the vapor phase, xylene and a sulfuric acid-mercuric sulfate catalyst into a reaction zone wherein the acetylene is present in a molar ratio of from about 1:5 to about 1:8 per mol of said xylene, agitating and circulating the reaction mixture in the zone at a sufficient rate to fully develop turbulence so as to obtain a homogeneous mixture and wherein the circulation rate to feed rate of reactants into said zone is within the order of from about 100:1 to about 200:1, maintaining the temperature of reaction within the range of from about 0° C. to about +10° C. and removing the reaction product from said zone at a rate equal to the rate of introduction of reactants thereinto.

7. A multi-stage continuous reaction process for the production of 1,1-diarylethane which comprises introducing into the first reaction zone a compound selected from the group consisting of mono- and di-alkyl substituted benzene, a sulfuric acid-mercuric sulfate catalyst and 1/$n$th of the total amount of acetylene to be reacted wherein $n$ represents the total number of stages in the reaction process and the total amount of acetylene is within the order of from about 1:2 to about 1:15 mols per mol of said substituted benzene, agitating and circulating the reaction mixture in the zone at a sufficient rate to fully develop turbulence so as to obtain a homogeneous mixture and wherein the circulation rate to feed rate of reactants into said zone is at least 100:1, maintaining the temperature of reaction within the range of from about —20° C. to about 50° C. and removing the reaction mixture from said first zone at a rate equal to the rate of introduction of reactants thereinto, introducing said reaction mixture into the subsequent reaction zone, adding thereto 1/$n$th of the total amount of acetylene, controlling the reaction in said subsequent reaction zone under reaction conditions maintained in said first zone, continuing the reaction in each subsequent reaction zone under reaction conditions maintained in said first zone until the total number of reaction stages and the total amount of acetylene have been utilized and removing the reaction product from the last zone at a rate equal to the rate of introduction of reactants thereinto.

8. A multi-stage continuous reaction process for the production of 1,1-ditolylethane which comprises introducing into the first reaction zone toluene, a sulfuric acid-mercuric sulfate catalyst and 1/$n$th of the total amount of acetylene to be reacted wherein $n$ represents the total number of stages in the reaction process and the total amount of acetylene is within the order of from about 1:2 to about 1:15 mols per mol of said toluene, agitating and circulating the reaction mixture in the zone at a sufficient rate to fully develop turbulence so as to obtain a homogeneous mixture and wherein the circulation rate to feed rate of reactants into said zone is at least 100:1, maintaining the temperature of reaction within the range of from about —20° C. to about 50° C. and removing the reaction mixture from said first zone at a rate equal to the rate of introduction of reactants thereinto, introducing said reaction mixture into the subsequent reaction zone, adding thereto 1/$n$th of the total amount of acetylene, controlling the reaction in said subsequent reaction zone under reaction conditions maintained in said first zone, continuing the reaction in each subsequent reaction zone under reaction conditions maintained in said first zone until the total number of reaction stages and the total amount of acetylene have been utilized and removing the reaction product from the last zone at a rate equal to the rate of introduction of reactants thereinto.

9. A multi-stage continuous reaction process for the production of 1,1-ditolylethane which comprises introducing into the first reaction zone toluene, a sulfuric acid-mercuric sulfate catalyst and 1/$n$th of the total amount of acetylene to be reacted wherein $n$ represents the total number of stages in the reaction process and the total amount of acetylene is within the order of from about 1:5 to about 1:8 mols per mol of said toluene, agitating and circulating the reaction mixture in the zone at a sufficient rate to fully develop turbulence so as to obtain a homogeneous mixture and wherein the circulation rate to feed rate of reactants into said zone is within the order of from about 100:1 to about 200:1, maintaining the temperature of reaction within the range of from about 0° C. to about +10° C. and removing the reaction mixture from said first zone at a rate equal to the rate of introduction of reactants thereinto, introducing said reaction mixture into the subsequent reaction zone, adding thereto 1/$n$th of the total amount of acetylene, controlling the reaction in said subsequent reaction zone under reaction conditions maintained in said first zone, continuing the reaction in each subsequent reaction zone under reaction conditions maintained in said first zone until the total number of reaction stages and the total amount of acetylene have been utilized and removing the reaction product from the last zone at a rate equal to the rate of introduction of reactants thereinto.

10. A four-stage continuous reaction process for the production of 1,1-ditolylethane which comprises introducing into the first reaction zone toluene, a sulfuric acid-mercuric sulfate catalyst and one-fourth of the total amount of acetylene to be reacted wherein the total amount of acetylene is within the order of from about 1:5 to about 1:8 mols per mol of said toluene, agitating and circulating the reaction mixture in the zone at a sufficient rate to fully develop turbulence so as to obtain a homogeneous mixture and wherein the circulation rate to feed rate of reactants into said zone is within the order of from about 100:1 to about 200:1, maintaining the temperature of reaction within the range of from about 0° C. to about +10° C. and removing the reaction mixture from said first zone at a rate equal to the rate of introduction of reactants thereinto, introducing said reaction mixture into the subsequent reaction zone, adding thereto one-fourth of the total amount of acetylene, controlling the reaction in said subsequent reaction zone under reaction conditions maintained in said first zone, continuing the reaction in each subsequent reaction zone under reaction conditions maintained in said first zone until the total number of reaction stages and the total amount of acetylene have been utilized and removing the reaction product from the last zone at a rate equal to the rate of introduction of reactants thereinto.

11. A four-stage continuous reaction process for the production of 1,1-dixylylethane which comprises introducing into the first reaction zone xylene, a sulfuric acid-mercuric sulfate catalyst and one-fourth of the total amount of aceylene to be reacted wherein the total amount of acetylene is within the order of from about 1:5 to about 1:8 mols per mol of said xylene, agitating and circulating the reaction mixture in the zone at a sufficient rate to fully develop turbulence so as to obtain a homogeneous mixture and wherein the circulation rate to feed rate of reactants into said zone is within the order of from about 100:1 to about 200:1, maintaining the temperature of reaction within the range of from about 0° C. to about +10° C. and removing the reaction mixture from said first zone at a rate equal to the rate of introduction of reactants thereinto, introducing said reaction mixture into the subsequent reaction zone, adding thereto one-fourth of the total amount of acetylene, controlling the reaction in said subsequent reaction zone under reaction conditions maintained in said first zone, continuing the reaction in each subsequent reaction zone under reaction conditions maintained in said first zone until the total number of reaction stages and the total amount of acetylene have been utilized and removing the reaction product from the last zone at a rate equal to the rate of introduction of reactants thereinto.

12. A multi-stage continuous reaction process for the production of 1,1-diarylethane which comprising introducing into the first reaction zone a compound selected from the group consisting of mono- and di-alkyl substituted benzene, a sulfuric acid-mercuric sulfate catalyst and a portion of the total amount of acetylene to be reacted wherein the total amount of acetylene is within the order of from about 1:2 to about 1:15 mols per mol of said substituted benzene, agitating and circulating the reaction mixture in the zone at a sufficient rate to fully develop turbulence so as to obtain a homogeneous mixture and wherein the circulation rate to feed rate of reactants into said zone is at least 100:1, maintaining the temperature of reaction within the range of from about —20° C. to about 50° C. and removing the reaction mixture from said first zone at a rate equal to the rate of introduction of reactants thereinto, introducing said reaction mixture into the subsequent reaction zone, adding thereto a portion of the total amount of acetylene, controlling the reaction in said subsequent reaction zone under reaction conditions maintained in said first zone, continuing the reaction in each subsequent reaction zone under reaction conditions maintained in said first zone until the total number of reaction stages and the total amount of acetylene have been utilized and removing the reaction product from the last zone at a rate equal to the rate of introduction of reactants thereinto.

13. A multi-stage continuous reaction process for the production of 1,1-ditolylethane which comprises introducing into the first reaction zone toluene, a sulfuric acid-mercuric sulfate catalyst and a portion of the total amount of acetylene to be reacted wherein the total amount of acetylene is within the order of from about 1:5 to about 1:8 mols per mol of said toluene, agitating and circulating the reaction mixture in the zone at a sufficient rate to fully develop turbulence so as to obtain a homogeneous mixture and wherein the circulation rate to feed rate of reactants into said zone is within the order of from about 100:1 to about 200:1, maintaining the temperature of reaction within the range of from about 0° C. to about +10° C. and removing the reaction mixture from said first zone at a rate equal to the rate of introduction of reactants thereinto, introducing said reaction mixture into the subsequent reaction zone, adding thereto a portion of the total amount of acetylene, controlling the reaction in said subsequent reaction zone under reaction conditions maintained in said first zone, continuing the reaction in each subsequent reaction zone under reaction conditions maintained in said first zone until the total number of reaction stages and the total amount of acetylene have been utilized and removing the reaction product from the last zone at a rate equal to the rate of introduction of reactants thereinto.

14. A multi-stage continuous reaction process for the production of 1,1-diarylethane which comprises introducing into the first reaction zone a compound selected from the group consisting of mono- and di-alkyl substituted benzene, a sulfuric acid-mercuric sulfate catalyst and a portion of the total amount of acetylene to be reacted wherein the total amount of acetylene is within the order of from about 1:2 to about 1:15 mols per mol of said substituted benzene, agitating and circulating the reaction mixture in the zone at a sufficient rate to fully develop turbulence so as to obtain a homogeneous mixture and wherein the circulation rate to feed rate of reactants into said zone is at least 100:1, maintaining the temperature of reaction within the range of from about —20° C. to about 50° C. and removing the reaction mixture from said first zone at a rate equal to the rate of introduction of reactants thereinto, introducing said reaction mixture into the subsequent reaction zone, adding thereto a portion of the total amount of acetylene and an additional amount of a sulfuric acid mercuric sulfate catalyst, controlling the reaction in said subsequent reaction zone under reaction conditions maintained in said first zone, continuing the reaction in each subsequent reaction zone under reaction conditions maintained in said first zone until the total number of reaction stages and the total amount of acetylene have been utilized and removing the reaction product from the last zone at a rate equal to the rate of introduction of reactants thereinto.

15. A multi-stage continuous reaction process for the production of 1,1-ditolylethane which comprises introducing into the first reaction zone toluene, a sulfuric acid-mercuric sulfate catalyst and a portion of the total amount of acetylene to be reacted wherein the total amount of acetylene is within the order of from about 1:5 to about 1:8 mols per mol of said toluene, agitating and circulating the reaction mixture in the zone at a sufficient rate to fully develop turbulence so as to obtain a homogeneous mixture and wherein the circulation rate to feed rate of reactants into said zone is within the order of from about 100:1 to about 200:1, maintaining the temperature of reaction within the range of from about 0° C. to about +10° C. and removing the reaction mixture from said first zone at a rate equal to the rate of introduction of reactants thereinto, introducing said reaction mixture into the subsequent reaction zone, adding thereto a portion of the total amount of acetylene and an additional amount of a sulfuric acid-mercuric sulfate catalyst, controlling the reaction in said subsequent reaction zone under reaction conditions maintained in said first zone, continuing the reaction in each subsequent reaction zone under reaction conditions maintained in said first zone until the total number of reaction stages and the total amount of acetylene have been utilized and removing the reaction product from the last zone at a rate equal to the rate of introduction of reactants thereinto.

16. A four-stage continuous reaction process for the production of 1,1-ditolylethane which comprises introducing into the first reaction zone toluene, a sulfuric acid-mercuric sulfate catalyst and a portion of the total amount of acetylene to be reacted wherein the total amount of acetylene is within the order of from about 1:5 to about 1:8 mols per mol of said toluene, agitating and circulating the reaction mixture in the zone at a sufficient rate to fully develop turbulence so as to obtain a homogeneous mixture and wherein the circulation rate to feed rate of reactants into said zone is within the order of from about 100:1 to about 200:1, maintaining the temperature of reaction within the range of from about 0° C. to about +10° C. and removing the reaction mixture from said first zone at a rate equal to the rate of introduction of reactants thereinto, introducing said reaction mixture into the subsequent reaction zone, adding thereto a portion of the total amount of acetylene and an additional amount of a sulfuric acid-mercuric sulfate catalyst, controlling the reaction in said subsequent reaction zone under reaction conditions maintained in said first zone, continuing the reaction in each subsequent reaction zone under reaction conditions maintained in said first zone until the total number of reaction stages and the total amount of acetylene have been utilized and removing the reaction product from the last zone at a rate equal to the rate of introduction of reactants thereinto.

References Cited in the file of this patent

UNITED STATES PATENTS

| | | |
|---|---|---|
| 2,268,187 | Churchill | Dec. 30, 1941 |
| 2,324,165 | Layng et al. | July 13, 1943 |
| 2,592,997 | Towle | Apr. 15, 1952 |
| 2,734,928 | Smolin | Feb. 14, 1956 |

FOREIGN PATENTS

| | | |
|---|---|---|
| 468,405 | Canada | Sept. 26, 1950 |

OTHER REFERENCES

Reichert et al.: "Jour. Am. Chem. Soc.," vol. 45 (1923), pp. 3090–3091.

Reilly et al.: "Jour. Am. Chem. Soc.," vol. 50 (1928), pp. 2564–66.

Rushton: "Mixing" in Weissberger, "Technique of Organic Chemistry"; New York, Interscience Publishers, Inc. 1950; vol. III, pages 99–130 (pages 100–102 only needed).